(No Model.)
T. D. CUNNINGHAM.
MILKING DEVICE.
No. 546,999. Patented Oct. 1, 1895.
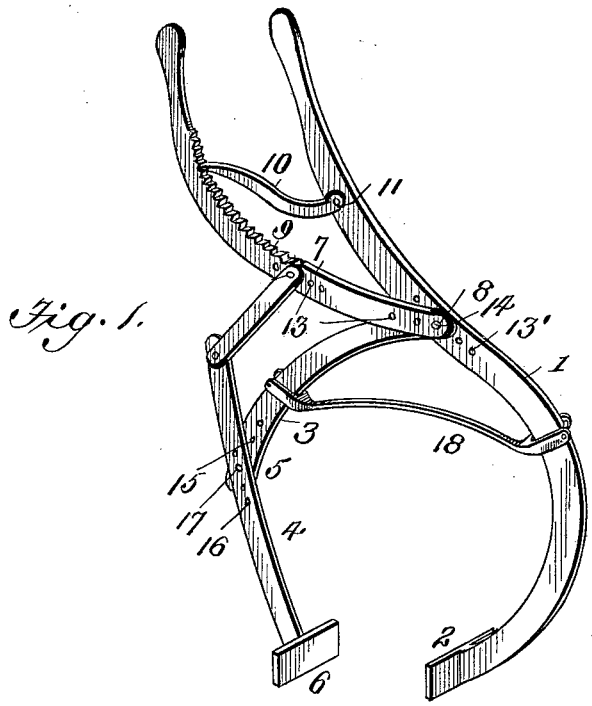
Witnesses
Inventor
Thomas D. Cunningham,
By H. B. Wilber, Attorney

UNITED STATES PATENT OFFICE.

THOMAS D. CUNNINGHAM, OF POCATELLO, IDAHO.

MILKING DEVICE.

SPECIFICATION forming part of Letters Patent No. 546,999, dated October 1, 1895.

Application filed January 7, 1895. Serial No. 534,117. (No model.)

*To all whom it may concern:*

Be it known that I, THOMAS D. CUNNINGHAM, a citizen of the United States, residing at Pocatello, in the county of Bannock and State of Idaho, have invented certain new and useful Improvements in Milking Devices; and I do declare the following to be a full, clear, and exact description of the invention, such as will enable others skilled in the art to which it appertains to make and use the same.

My invention has relation to a device adapted for use upon cows to prevent them from kicking while being milked and to thereby "break" them for the milking operation; and my invention has for its object to provide a simple and inexpensive device which is adjustable to adapt it for use upon cows of various sizes, and which is efficient in operation; and my invention consists in the novel construction, arrangement, and combination of parts as hereinafter fully described, illustrated in the drawings, and pointed out in the appended claim.

In the drawings, Figure 1 is a perspective view of my device. Fig. 2 is a similar view showing the application thereof.

In carrying out my invention I provide a lever 1, having a shape substantially as shown, the upper end thereof forming a handle and the lower portion being provided with a plate or strip 2. To the lever 1 is pivotally secured one end of a curved bar 3, whose opposite end is pivotally connected to a lever 4 at a point 5 intermediate the ends of the lever 4, the lower end of the latter being provided with a plate or strip 6, similar to the plate 2.

7 indicates a lever, which is pivotally secured at its lower end, as at 8, to the lever 1, and the inner edge of said lever 7 is toothed or serrated, as at 9, with which toothed portion a pawl 10 engages, said pawl being pivoted to the lever 1, as seen at 11. A link 12 is pivotally connected at its ends to the lever 7 and the lever 4.

In order to provide for an adjustable connection between the levers 1 and 7 and bar 3 and the latter and the lever 4, I provide the levers 1 and 7 with a series of holes 13 13', through different ones of which and an opening in the bar 3 the pivot bolt or pin 14 may be passed, and I also provide the bar 3 with openings 15 and the lever 4 with openings 16, through different ones of which the pivot bolt or pin 17 may be passed. Thus the said parts may be adjusted to various sizes of cows.

In use the device is applied as represented in Fig. 2, with the plates 2 and 6 pressing upon the upper portions of the hind legs of the animal, and the levers 1 and 7 are then forced apart until sufficient pressure is exerted upon the animal by the plates, and the device is then left intact until the milking operation is completed. When the device is applied as described it will be found that the animal will not offer to kick, thus rendering the device advantageous for the described purpose.

For maintaining the parts in their adjusted position and maintaining the pressure upon the animal I employ a strip 18, made of spring steel and secured at its ends to the lever 1 and bar 3, as seen, said strip being adapted to yield or flex lengthwise to permit the parts to separate when being applied over the animal, and at the same time serve to exert a constant stress upon the lever 1 and bar 3 to draw them toward each other and thus maintain the clamping action of the plates 2 and 6.

What I claim, and desire to secure by Letters Patent, is—

The combination of a lever 1, the upper end of which terminates in a handle, said lever being provided with a series of openings 13', a curved bar 3, provided with openings 15, the lever 4 also having a series of openings 16, the lever 7 having a series of openings 13 at one end, a pivot pin passing through an opening in the lever 7 and an opening in the lever 1, a pivot pin passing through an opening in the lever 3 and an opening in the lever 4, a link pivotally connected at one end to the upper end of lever 4 and at its opposite end to the lever 7, the latter being provided with a series of openings 13 adapted to receive a pivot pin for adjustably pivoting the link to said lever 7, the latter being provided with notches 9, a pawl pivoted to lever 1 and engaging the notches, and a strip 18 of spring steel secured at opposite ends to the lever 1 and bar 3, and adapted to yield lengthwise for the purpose stated, and the plates 2 and 6 secured to the lower ends of the levers 1 and 4, as specified.

In testimony whereof I affix my signature in presence of two witnesses.

THOMAS D. CUNNINGHAM.

Witnesses:
J. C. CUNNINGHAM,
L. D. WILBER.